United States Patent Office 3,568,316
Patented Mar. 9, 1971

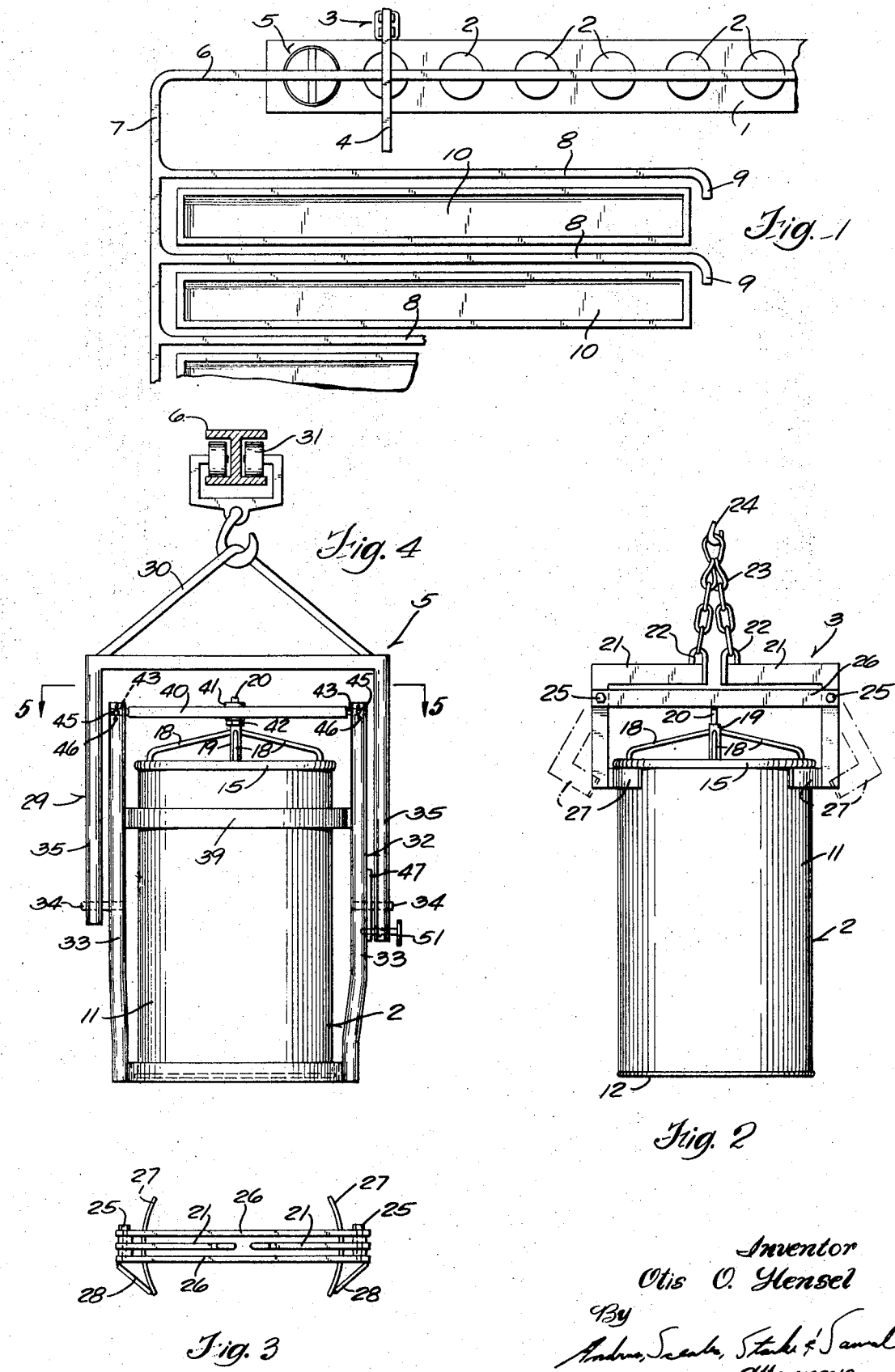

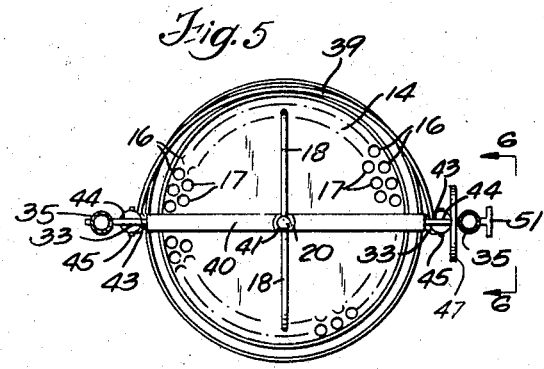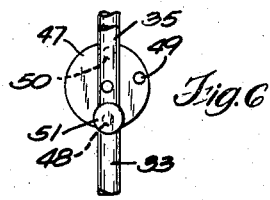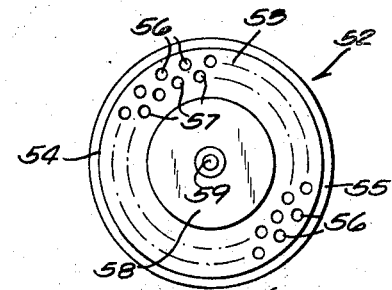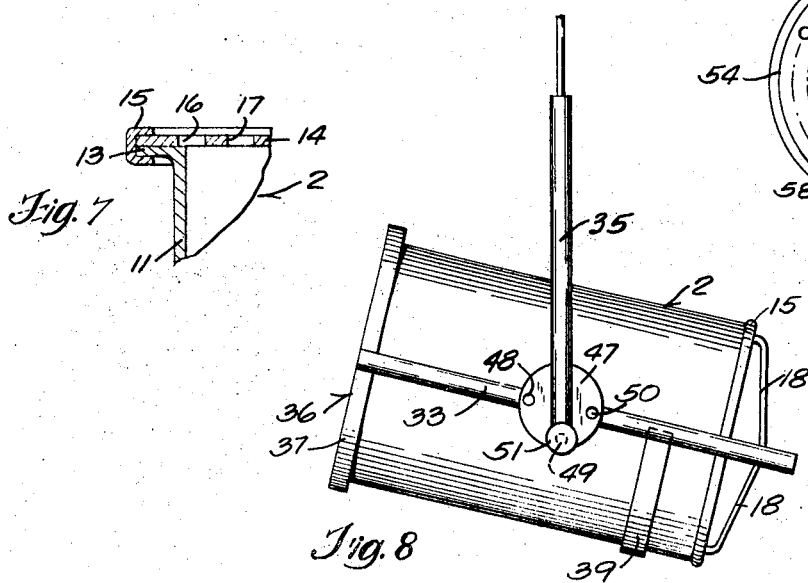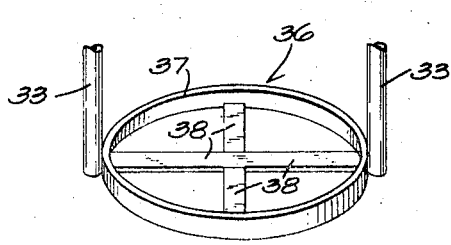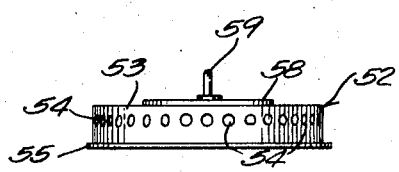

3,568,316
APPARATUS FOR DRAINING WHEY
FROM CHEESE
Otis O. Hensel, P.O. Box 186, Hustisford, Wis. 53034
Filed Jan. 21, 1969, Ser. No. 792,599
Int. Cl. A01j 25/11
U.S. Cl. 31—48                                    15 Claims

ABSTRACT OF THE DISCLOSURE

An apparatus for pressing and draining whey from cheese. The cheese to be treated is contained within a barrel enclosed with a perforated head or lid. A hoist unit lifts the barrel into a supporting cradle which rides on an overhead rail extending within the plant. The cradle comprises an outer frame suspended from the rail, and an inner frame containing the barrel is pivotally connected to the outer frame about a horizontal axis, so that the barrel can be tilted to thereby permit the whey to drain from the cheese through the perforated head.

A locking mechanism is included to lock the barrel in the upright position as well as to lock the barrel in the titled or inclined position.

The lid for the barrel includes an axial pin which is journalled within the inner frame so that the barrel, when the tilted or inclined position.

The invention relates to an apparatus for pressing and draining whey from cheese, and more particularly to a cradle for supporting a barrel containing cheese and which can be tilted to drain the residual whey from the cheese and compress or matt the cheese.

In the conventional cheese making process for preparing cheddar and colby cheese, the cheese curd is removed from the cheese making vat and placed in an open topped barrel. Normally a sleeve is placed in the open end of the barrel and the cheese is filled to a level about six inches above the top of the barrel. In the conventional process, a pipe is then inserted within the mass of cheese within the barrel and a vacuum is drawn in the pipe to remove residual whey from the cheese. The cheese is then pressed into the barrel either by mechanical or hydraulic pressing equipment, or by placing a lid on the cheese and weighting the lid.

Due to the fact that a considerable quantity of cheese, approximately 550 pounds, is contained within the barrel the automatic pressing equipment used to compress the cheese is relatively complicated and expensive. The use of weights is considerably less expensive than automatic pressing equipment, but the weights are sizable and weigh about 100 pounds apiece so that they not only occupy considerable storage space, but it requires substantial manual labor to apply the weights to the lid and subsequently remove the weights.

The present invention is directed to an apparatus for pressing and draining the residual whey from the cheese. According to the invention, the cheese is pressed within the barrel and a perforated lid is attached to the open top of the barrel. After attachment of the lid, the barrel is lifted by a hoist unit into a supporting cradle which is suspended from an overhead rail or track. The cradle comprises an outer frame, which is mounted for movement on the rail, and an inner frame is pivotally connected to the outer frame about a horizontal axis, so that the barrel can be tilted to a downwardly inclined position to permit the residual whey to drain from the cheese through the perforated lid.

To lock the barrel in the downwardly inclined position, a locking mechanism is provided which locks the inner frame with respect to the outer frame.

While in the downwardly inclined position, the barrel can be rotated about its axis, and to facilitate this rotation a pin extends outwardly from the lid and is journalled within the inner frame of the cradle.

In operation, the barrel is initially lifted into the cradle and the pin in the barrel lid is engaged within the inner frame. The cradle is then moved along the rail to a drainage area. By tilting the inner frame with respect to the outer frame, the barrel will be positioned in a downwardly inclined attitude, whereat the axis of the barrel is located at an angle of 5 to 30° with respect to the horizontal. At this inclined position the residual whey will drain from the cheese into a drainage trough. During the period of time that barrel is in the inclined position the barrel is also rotated about its axis. Subsequently the barrel is returned to the upright position and the cradle containing the upright barrel is then moved along the rail to an unloading station.

The apparatus of the invention is a simple and inexpensive unit which enables the residual whey to be drained from the curd. Moreover the unit of the invention eliminates the need for conventional pressing equipment, for the weight of the curd itself is employed to matt and compress the curd when the barrel is in the inclined position.

The apparatus of the invention, by utilizing the hoist unit, eliminates manual lifting and handling of the barrel, so that the labor involved in the process is considerably reduced over conventional processes.

By maintaining the barrel at an angle of 5 to 30°, and by intermittently rotating the barrel while at this inclined attitude, the residual whey is effectively drained from the curd and proper matting of the curd is achieved.

Other objects and advantages will appear in the course of the following description.

The drawings illustrate the best mode presently contemplated of carrying out the invention.

In the drawings:

FIG. 1 is a diagrammatic illustration of a cheese making plant employing the apparatus of the invention;

FIG. 2 is a side elevation of a barrel engaged by the clamping mechanism of the hoist unit;

FIG. 3 is a plan view showing the barrel lid and the clamping mechanism;

FIG. 4 is a side elevation of the supporting cradle containing the barrel;

FIG. 5 is a section taken along line 5—5 of FIG. 4;

FIG. 6 is a section taken along line 6—6 of FIG. 5;

FIG. 7 is an enlarged fragmentary vertical section showing the clamping band attaching the lid to the barrel;

FIG. 8 is a view similar to FIG. 4 and showing the barrel in the tilted position;

FIG. 9 is a perspective view of the base of the cradle;

FIG. 10 is a side elevation of a modified form of the lid for the barrel; and

FIG. 11 is a plan view of the lid shown in FIG. 10.

FIG. 1 is a diagrammatic layout showing the apparatus of the invention as incorporated in a cheese making plant. The apparatus includes a conveyor 1, which supports and conveys a series of barrels 2 containing the cheese. The cheese can be cheddar, colby, stirred curd, or the like.

An overhead hoist unit 3, which is movable along a track 4 is employed to individually lift each of the barrels 2 from the conveyor 1, and the elevated barrel is then positioned within a supporting cradle 5 which is mounted for movement on an overhead track or rail 6. The track 6 is connected to the lateral track 7, which in turn is connected to a series of parallel tracks 8, each of which terminates in an end 9 which functions as an unloading station. Drain pans 10 are located between the parallel tracks 8.

In general, each of the barrels 2 containing the cheese is lifted by the hoist unit 3 and positioned within the cradle 5. The cradle 5 is then moved along with tracks 6 and 7 on to one of the tracks 8. The barrel 2 is then inverted to a downwardly inclined position so that the residual whey will be drained from the barrel and collected in the drain pan 10.

The barrel 2, which contains the cheese, includes a generally cylindrical sidewall 11 and a bottom wall 12. The upper end of the sidewall 11 is open and terminates in an outwardly extending lip 13. After the cheese has been placed within the barrel 2, the open top of the barrel is enclosed by a cover or lid 14 and a clamping ring 15 having a generally U-shaped cross section serves to clamp the peripheral margin of the cover 14 to the lip 13 on the barrel, as shown in FIG. 7.

As best shown in FIG. 5, the cover 14 is provided with two circular rows of holes 16 and 17 which are located along the margin of the cover. When the cover is in place on the barrel 2, the outer row of holes 16 will extend outwardly beyond the internal diameter of the barrel 2 so that the whey contained within the barrel will drain through the openings and there will be no ledges to trap the whey.

The cover 14 is reinforced by a series of radially extending braces 18 and the inner ends of the braces are connected to a central column 19. Extending upwardly from the central column 19 is a pin 20 and the barrel 2 is journalled for rotation about the axis of pin 20 when the barrel is supported in cradle 5.

The hoist unit 3 which is employed to lift the barrel 2 from the container includes a pair of generally L-shaped arms 21 and the inner end of each arm is provided with a hook 22. A chain 23 is attached to the hooks 22 and passes through an eye 24 of the hoist unit. The hoist unit itself is of conventional construction and serves to raise and lower the eye 24 which correspondingly raises and lowers the arms 21.

The central portion of each arm 21 is pivotally connected by pin 25 between a pair of cross bars 26, and the lower end of each arm 21 carries a generally curved shoe 27 which is adapted to engage the sidewall 11 of the barrel 2 beneath the clamping ring 15. A brace 28 is connected between one end of the shoe 27 and the brace 25 to provide reinforcement for the shoe.

With the hoist unit in the lowered position, the operator can pivot the shoes outwardly and bring the shoes into engagement with the side wall of the barrel. The hoist unit 3 is then raised, causing the upper ends of arms 21 to pivot upwardly and thereby tightly clamp the shoes against the sidewall 11 of the barrel. With this construction the clamping shoes 27 will automatically be urged into engagement with the barrel when the hoist unit is raised. When the barrel is lowered to the ground further lowering of the hoist will automatically pivot the shoes out of engagement with the barrel so that the hoist can be withdrawn.

The cradle 5 includes a generally U-shaped outer frame 29, and a V-shaped support 30 is connected to the frame 29 and is suspended from a roller unit 31 which rides on the track 6. In addition to the outer frame 29, the cradle also includes an inner frame 32 which is composed of a pair of arms 33 that are pivotally connected by pins 34 to the arms 35 of outer frame 29. The lower ends of the arms 33 are connected to a base 36 which, as shown in FIG. 9, includes a cylindrical ring 37 and a pair of cross braces 38. The lower end of the barrel is supported on the cross braces 38. The lower end of the barrel is supported on the cross braces 38 and the cylindrical ring 37 prevents lateral displacement of the barrel from the base.

The barrel is supported in the inner frame by a generally curved brace 39 which is connected between the arms 33.

The inner frame 32 of cradle 5 also includes a cross-bar 40 which is connected between the upper ends of arms 33, and the pin 21 of cover 14 is journalled within a bushing 41 in cross-bar 40 so that the barrel 2 can be rotated about its axis while supported in the inner frame 32. To facilitate rotation, a washer 42 formed of a self-lubricating material, such as Teflon or nylon, is located between the cross bar 40 and the base of the pin 20.

The cross bar 40 is provided with flat ends 43 which are received within slots 44 formed in the upper ends of the arms 33. To lock the ends 43 within the slots 44, a pin 45 extends through one of a series of holes 46 in each arm 33 as well as through an aligned hole in the end 43 of the cross bar. As the cover 14 may vary in size and shape depending on the particular type of cheese being processed, the series of holes 46 provides an adjustment for different size covers.

To lock the inner frame 32 with respect to the outer frame 29 and prevent the tilting of the barrel a disc 47 is secured to one of the arms 33 and is provided with three holes 48, 49 and 50. A spring loaded pin 51 is adapted to extend through a hole in arm 35 and is received in one of the holes 48-50 in the disc 47. Engagement of the pin 51 with one of the holes 48-50 serves to prevent rotation of the inner frame 32 with respect to the outer frame 29. If the pin 51 is inserted in the hole 48, the barrel 2 will be locked in an upright position with respect to the cradle, while if the pin is inserted through the opening 49, the barrel will be locked in an inclined position, as shown in FIG. 8, in which the axis of the barrel is located at an angle of 5 to 30° and preferably from 12 to 15° with respect to the horizontal. In some cases it may also be desired to lock the barrel in an inverted position in which case the pin 51 would be inserted through the opening 50.

In operation, the barrel 2 is filled with cheese. The cheese is pressed in the barrel and the cover 14 is then clamped to the barrel by the clamping ring 15. The barrel is moved along the conveyor 1 and the hoist unit 3 is then lowered and the clamping shoes 27 are positioned around the barrel. The hoist unit 3 is then raised which causes the shoes 27 to move inwardly against the sidewall 11 of the barrel and beneath the clamping ring 15 so that continued upward movement of the hoist unit will lift the barrel. With the barrel elevated above the conveyor 1, the cradle 5 is moved manually along the track 6 and positioned around the barrel 2, with the lower end of the barrel above the base 36 of the cradle. The hoist 3 is then lowered until the bottom 12 of the barrel engages the base 36 and continued downward movement of the hoist will spread the shoes 27 apart so that the hoist unit can be withdrawn from the barrel.

After withdrawal of the hoist unit, the pin 20 is engaged with the bushing 41 in cross bar 40 and the cross bar is then locked to the arms 33 by insertion of the pins 46 within the holes 45.

With the barrel then locked within the cradle, the cradle is moved along the track 6, down the track 7 and onto one of the parallel drainage tracks 8. With the cradle 5 located on the track 8, the locking pin 51 is disengaged from the hole 48 and the inner frame as well as the barrel 2 are then pivoted or tilted so that the barrel is in an inclined position as shown in FIG. 8. The pin 51 is then inserted within the opening 49 to lock the barrel at this inclined attitude with the lid 14 being located at the lower end of the inclined barrel.

The residual whey contained within the cheese curd will then drain toward the low end of the barrel and be discharged through the holes 16 and 17 into the drip pans 10.

The angle of incline is maintained between the limits of 5° and 30° to the horizontal and preferably 12° to 15°. These limits of angularity are important to the invention for they provide adequate drainage of the whey as well as providing the proper matting or compression of the cheese within the barrel.

After the barrel has been in the inclined position for a period of approximately 15 minutes, the barrel is then rotated approximately 90° about its own axis and maintained in this position for a second 15 minute period. This procedure is repeated with the barrel, while inclined, being rotated 90° every 15 minutes for a total period of 1 hour. At the end of the 1 hour period, the locking pin 51 is disengaged from the hole 49 and the barrel is tilted to an upright position and the locking 51 is engaged with the hole 48 to lock the barrel in the upright position. The cradle 5 is then moved along the track 8 to the unloading station 9 where the barrel can be unloaded from the cradle by a hoist unit similar to that of unit 3.

After unloading from the cradle, the cover 14 is removed and a standard cover is applied to the barrel and the cheese is then moved to a storage location.

FIGS. 10 and 11 illustrate a modified form of the cover which is generally used when dealing with Colby cheese. The cover 52 includes an upper surface 53 and a generally cylindrical sidewall 54 which terminates in an outwardly extending flange 55. The cover 52 is clamped to the open end of the barrel by a clamping ring 15 which engages the flange 55.

As in the case of the cover 14, the upper surface 53 of cover 52 is provided with two rows of holes 56 and 57 which are located along the peripheral margin of the surface 53. The residual whey contained within the cheese curd is drained through the holes 56 and 57 when the barrel is inverted as previously described.

The upper surface 53 is reinforced by a plate 58 and a pin 59, similar to pin 20, extends upwardly from the plate 58.

The invention provides a simple and inexpensive apparatus for draining the residual whey from the cheese and also aids in matting or compressing the cheese within the barrel. By inverting or tilting the barrel to an angle in the range of 5° to 30° proper matting of the cheese is provided as well as providing optimum draining of the whey from the cheese curd.

The device of the invention eliminates the more expensive and complicated automatic pressing equipment often used in conventional processes and also eliminates the need for weights as used in other conventional methods.

Various modes of carrying out the invention are contemplated as being within the scope of the following claims particularly pointing out and distinctly claiming the subject matter which is regarded as the invention.

I claim:

1. An apparatus for draining whey from cheese curd, comprising an open top container to contain the cheese curd, a removable lid to enclose the open top of the container and having an opening therein, a first frame, a second frame to support the container, means pivotally connecting the second frame to the first frame for moving the container from a generally upright position to an inclined position, the whey draining by gravity from the cheese curd and being discharged through said opening when the container is in said inclined position, and mounting means for mounting the container for rotation about its longitudinal axis with respect to said second frame.

2. The apparatus of claim 1, and including a collection vessel located beneath the container to receive the whey being drained from said container.

3. The apparatus of calim 1, wherein said container includes a removable lid and said opening is in said lid, and said mounting means comprises a first journalling member connected to said lid and rotatably connected to a second journalling member on said second frame.

4. An apparatus for treating cheese curd comprising, an open top container to contain cheese curd and residual whey, a first frame, a second frame to support the container, a removable lid enclosing the open top of the container and having a series of drain holes, means pivotally conecting the second frame to the first frame for moving the container from a first generally upright position whereby the whey cannot drain from the drain holes in the lid to a second generally inclined position whereat the axis of the container is located at an angle of 5° to 30° with respect to a horizontal plane and the whey can drain through the drain holes in the lid, means for locking said second frame with respect to said first frame when said container is at said inclined position, and mounting means for mounting the container for rotation about its longitudinal axis with respect to said second frame.

5. The apparatus of claim 4, wherein said lid is provided with a central outwardly extending pin, and said apparatus includes means for journalling the pin for rotation with respect to said second frame.

6. The apparatus of claim 5, wherein said journalling means comprises a cross member extending across the second frame and spaced axially from the lid, and an annual bearing member surrounding said pin and located between the lid and said cross member.

7. The apparatus of claim 6, wherein said bearing member is formed of a self-lubricating plastic material.

8. The apparatus of claim 4, wherein said second frame includes a base to support the container, and a pair of side members extending outwardly from said base, said side members being pivotally connected to said first frame.

9. The apparatus of claim 8, wherein said second frame also includes a cross member connecting the outer ends of the side members, and said lid is provided with a central outwardly extending pin journalled for rotation in said cross member, said cross member and said pin comprising said mounting means.

10. In a cheese making apparatus, a conveyor having a conveying surface to support and convey a container of cheese containing residual whey, hoist means disposed above the conveyor for lifting the container above said conveying surface, a track disposed above the conveyor, and a cradle mounted for travel on the track and including a first frame and a second frame to support the container, said hoist means acting to elevate said container above said conveying surface and the elevated container being engaged with said second frame, said cradle also including means pivotally connecting the second frame to the first frame for moving the container supported by said second frame from a generally upright position to an inclined position so that the residual whey can be drained from the container, and said cradle also including means for mounting the container for rotation about its longitudinal axis with respect to the second frame.

11. The structure of claim 10, and including drain means located generally beneath said track and disposed to receive the residual whey when it is drained from said container.

12. The structure of claim 10 wherein said first and second frames have aligned open sides whereby the elevated container can be moved through said open sides and into position on said second frame.

13. The apparatus of claim 10, wherein said hoist means includes a plurality of clamping shoes to engage the sidewall of the container, and means for urging the shoes into clamping engagement as the hoist means is elevated.

14. The apparatus of claim 13, wherein said shoes are attached to the lower ends of pivotable generally L-shaped arms and said hoist means includes a lifting member attached to the upper ends of said arms.

15. The apparatus of claim 4, wherein said lid is provided with a series of circumferentially spaced holes, with each hole of said series extending radially outward beyond the internal diameter of the container.

References Cited

UNITED STATES PATENTS

| | | | |
|---|---|---|---|
| 93,761 | 8/1869 | Spring | 294—90 |
| 2,567,957 | 9/1951 | Miollis | 31—49 |
| 3,032,877 | 5/1962 | Collins | 31—46 |
| 3,057,654 | 10/1962 | Beauchamp, Jr. | 294—106 |
| 3,292,259 | 12/1966 | Lambert et al. | 31—48 |
| 3,352,591 | 11/1967 | Casey | 294—81 |
| 3,355,805 | 12/1967 | Krueger et al. | 31—46 |

ALDRICH F. MEDBERY, Primary Examiner

U.S. Cl. X.R.

31—49

UNITED STATES PATENT OFFICE
CERTIFICATE OF CORRECTION

Patent No. 3,568,316          Dated  March 9, 1971.

Inventor(s)   Otis O. Hensel

It is certified that error appears in the above-identified patent and that said Letters Patent are hereby corrected as shown below:

Column 1, line 23, cancel "titled" and substitute therefor ---tilted---, Column 1, line 26, cancel "the", column 1, line 26, Cancel "or inclined position" and substitute there ---,(comma) can be rotated about its axis---

Signed and sealed this 3rd day of August 1971.

(SEAL)
Attest:

EDWARD M. FLETCHER, JR.
Attesting Officer

WILLIAM E. SCHUYLER,
Commissioner of Pate